United States Patent [19]

Glen

[11] 3,709,338
[45] Jan. 9, 1973

[54] SINGLE PEDAL BRAKE-ACCELERATOR MECHANISM WITH CRUISE CONTROL

[76] Inventor: Edward C. Glen, 39643 Royal Palm Drive, Fremont, Calif. 94538

[22] Filed: Sept. 28, 1970

[21] Appl. No.: 76,174

[52] U.S. Cl. .................192/3 S, 74/512, 74/561
[51] Int. Cl. ...............................F16d 67/00
[58] Field of Search..........192/3 S, 3 T; 74/560, 561, 74/512, 478.5, 531

[56] References Cited

UNITED STATES PATENTS 1,503,525  8/1924  Davis....................................192/3 S
3,305,053  2/1967  Pascual................................192/3 S
1,320,561  11/1919  Mahr....................................192/3 T

*Primary Examiner*—Benjamin W. Wyche
*Assistant Examiner*—Randall Heald
*Attorney*—Stanley Bialos and Gregg, Hendricson and Caplan

[57] ABSTRACT

A single pedal, throttle and brake actuator for a self-powered vehicle including automatic throttle setting or cruise control. A single, pivoted foot pedal operates throttle and brake mechanisms with holding means maintaining any adjusted throttle position until readjustment by foot pressure.

4 Claims, 4 Drawing Figures

PATENTED JAN 9 1973
3,709,338
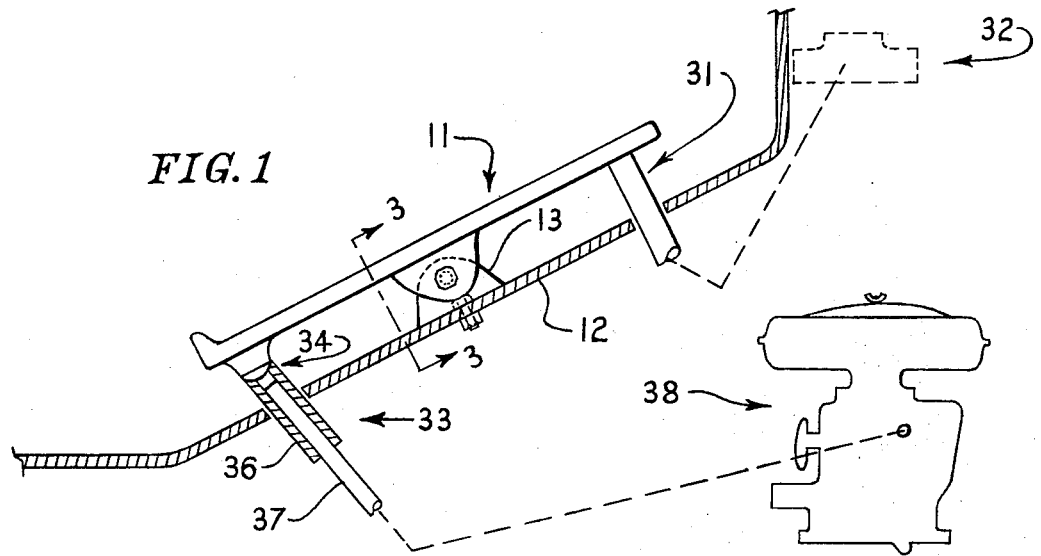
FIG. 1
FIG. 2
FIG. 3
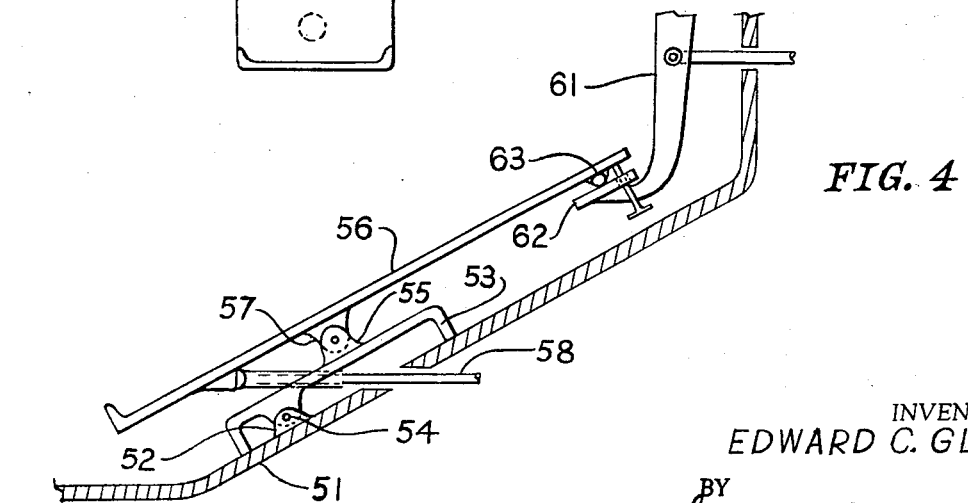
FIG. 4
INVENTOR.
EDWARD C. GLEN
BY
*Stanley Bialos*
ATTORNEYS

SINGLE PEDAL BRAKE-ACCELERATOR MECHANISM WITH CRUISE CONTROL

BACKGROUND OF INVENTION

There have been proposed a variety of different foot pedals devices for automobiles and the like wherein a single pedal is provided for controlling the accelerator or throttle setting and applying brakes. There have in fact been issued a multiplicity of patents in this field with a variety of varying features intended to facilitate the driving of an automobile particularly with regard to acceleration and braking.

One of the limitations or drawbacks of the conventional throttle and braking system of an automobile is the necessity for the operator to continuously apply pressure to the acceleration pedal in order to maintain a constant speed of travel. In this respect there have been developed various types of cruise control devices varying from a simple hand throttle which can be set to remain in position until reset to very complicated devices. Single pedal accelerator-brake mechanisms do not normally incorporate any type of cruise control as an integral part thereof. It is well set forth in many issued patents that great advantage lies in the ability to control both braking and accelerating with a single foot pedal and one of these advantages is the instantaneous and natural control available by single foot movement. Thus it is believed equally obvious that incorporation of what may be termed cruise control or maintenance of throttle setting through this single pedal mechanism comprises a further advancement in the art.

There is provided by the present invention a single pedal mechanism for controlling braking and throttle setting of a self powered vehicle together with means for maintaining the throttle setting in the absence of foot pressure changing same.

SUMMARY OF INVENTION

There is provided by the present invention a single foot pedal pivotally mounted at the center thereof and mechanically connected at the toe portion of the pedal to a brake actuator and at the heel portion of the pedal to an accelerator or throttle control. Thus toe pressure or pivoting of the foot forward on the pedal applies the brakes while pivoting of the foot backward to apply heel pressure advances the throttle setting to increase speed. The brake actuator is normally biased to return the setting to an idle position. These biased conditions are conventional for automobiles, trucks and the like normally employed on the highways of the country.

The present invention furthermore provides in the pivotal mounting of the single foot pedal hereof spring biasing means for maintaining the pedal in any reverse pivoted position, i.e., heel depressed position. This spring biasing in the pivotal mounting of the pedal is sufficiently strong to overcome the normal throttle control biasing but is not sufficiently strong to overcome the normal brake control biasing. Thus the invention operates through a single pedal control mechanism to apply either brake or gas and furthermore maintains the gas or throttle setting to materially facilitate the control of a vehicle.

DESCRIPTION OF FIGURES

The present invention is illustrated as to particular preferred embodiments thereof in the accompanying drawings wherein:

FIG. 1 is a side elevational view of a single pedal mechanism in accordance with the present invention and schematically illustrating connections to braking system and carburetor of a conventional automobile;

FIG. 2 is a plan view of the single pedal of the present invention;

FIG. 3 is a sectional view taken in the plane 3—3 of FIG. 1 and illustrating one embodiment of pedal biasing means in accordance with the present invention; and FIG. 4 is a side elevational view of an embodiment of the present invention adapted to be marketed as a modification kit for conventional automobiles.

DESCRIPTION OF PREFERRED EMBODIMENTS

Referring first to FIGS. 1 to 3 of the drawings there will be seen to be illustrated an elongated foot pedal 11 adapted to be pivotally mounted immediately above a floor board 12 of a vehicle such as a passenger car or automobile as by means of a mounting bracket 13. The pedal is pivotally mounted somewhere near or adjacent the center thereof as regards pedal length and the pedal may include a pair of depending lugs 16 and 17 spaced apart laterally of the pedal. The bracket 13 may, for example, be formed as a U-shaped member adapted for attachment to the floor board 12 as by means of bolts 18. Aligned openings are formed in opposite upright sides of the bracket 13 and an opening is formed in each of the lugs 16 and 17 in alignment.

In the embodiment of the present invention illustrated in FIG. 3 the lugs 16 and 17 are spaced apart a distance such that they fit beside the upright sides of the bracket 13 in engagement therewith. Bolts 21 and 22 extend as axles through the aligned opening in the lug 16 and its contiguous bracket side and through the lug 17 and its contiguous bracket side. The pedal will thus be seen to be pivotally mounted upon the bracket by two axles or bolts 21 and 22.

In accordance with the present invention there is furthermore provided biasing means for urging the pedal to remain in any pivoted position. These means are shown in FIG. 3 to comprise a pair of compression springs 23 and 24 disposed about the axles or bolts 21 and 22 respectively in compression between nuts 26 and 27 threaded on the axles or bolts and the lug 16 in one case and the bracket 13 in the other. It will be appreciated that the physical structure of the axles may be widely varied, but it is provided herein that there shall be employed in connection with the pivotal mounting of the pedal upon the brackets or the like spring biasing means frictionally engaging the mounting connection to thereby resist pivotal movement of the pedal. If the axles are in fact formed as bolts there would normally be provided not only a nut on each bolt but also a lock nut or cotter pin or the like to prevent any inadvertent unthreading of the nuts from the bolt. Washers may be provided as indicated. It is to be further noted that in the illustrated structure of FIG. 3 the axles are not threaded through the upright bracket portion or pedal lugs but instead extend therethrough as a smooth round shaft to accommodate pivotal motion of the pedal with respect to the mounting bracket.

Considering now the connections of the pedal 11 it is noted that the forward or toe portion of the pedal is adapted to engage brake actuating mechanism generally indicated by the numeral 31 so that upon depression of the toe portion of the pedal the brakes are actuated, as, for example, by means of a hydraulic cylinder generally indicated at 32. It will be appreciated that conventional braking mechanisms of automobiles, trucks and other vehicles include biasing means returning the actuator to a normal or off position and while such biasing means are not illustrated in the drawings hereof it is assumed that same are present as a part of the automobile braking system.

At the opposite or heel end of the foot pedal 11 there is provided a connection to throttle control mechanism or accelerator mechanism as it is commonly termed. Such throttle control means are generally indicated at 33 and it is shown in FIG. 1 that the connection shall include a universal joint 34 and for the illustrated application a lost motion device. Such a device is shown in FIG. 1 as including a hollow tube 36 within which slides a rod 37. This rod forms a part of linkage extending to propulsion control means such as for example the control arm of a carburetor 38.

It will be seen that depression of the heel portion of the pedal 11 to pivot the pedal from a normal position somewhat as illustrated in FIG. 1 forces the carburetor control rod 37 forwardly to open the throttle of the carburetor and consequently to accelerate or increase the speed of the vehicle. On the other hand pivoting of the foot pedal forwardly depresses the brake actuator 31 to apply the brakes. As the brakes are being applied the tube 36 slides on the carburetor control rod 37 away from the rod. It is not necessary for the pedal to be connected to the brake actuator although if desired a lost motion mechanism may be also provided as such a connection.

Conventional automobiles are normally provided with a separate brake pedal adjacent the gas pedal or accelerator and normally disposed to the left of the accelerator. Normal motorists reactions particularly in an emergency situation where stopping of a vehicle is required would result in the operator moving his foot to the left to depress the brake pedal. Such movement is not necessary with the single pedal device of the present invention however, the pedal 11 may be provided with a lateral extension 41 extending to the left of the pedal at the top thereof. Such an extension would then ensure that even if the operator were to inadvertently remove his foot from the pedal and attempt to apply the brakes of the vehicle in the normal position of the brake pedal he would yet engage the upper extension of the pedal hereof and consequently still apply the brakes. This extension is further more desirable under those circumstances wherein a conventional vehicle is to be modified as by a kit or the like for carrying out the present invention. The brake actuator 31 is normally located to the left of the accelerator and may either extend upwardly through the floor board or possibly depend downwardly from the fire wall to be operated in a pivotal manner. In either case the actuator is normally not located in line with the accelerator mechanism and thus the lateral extension 41 on the pedal may be employed to engage the brake actuator without the necessity of modifying the location of such actuator.

In use of the present invention it is particularly noted that, with the foot placed upon the pedal 11, heel pressure to pivot the plate downwardly at the rear serves to accelerate the vehicle while toe pressure to pivot the pedal downwardly at the front releases the accelerator and applies the brakes. This particular arrangement is employed herein upon the basis that natural reactions call for pressing the ball or toe of the foot downwardly to stop an automobile. Thus in an emergency situation the operator would naturally apply the brakes rather than accelerate the car.

With regard to normal driving situations it is noted that the pedal 11 is depressed at the rear or heel portion thereof to thus advance the throttle setting to such a point that the vehicle is traveling at a desired rate. The spring biasing means in the pivotal mounting of the pedal increases the friction in this mounting to such a point that the pedal will remain in any desired heel depressed position. As noted above, the propulsion control means, in this case the carburetor, is normally biased to move the throttle control to a minimum setting for engine idling. The present invention however, provides the spring biasing means in the pivotal mounting with sufficient force to overcome the normal carburetor biasing or spring tension on the control arm thereof. It will be seen that the springs 23 and 24 may be tightened as required to apply the desired biasing or force to the pivotal mounting for holding the pedal in any preset throttle position. The return force or biasing applied by the braking system of the vehicle is however, greater than the restraining force of the springs 23 and 24 in the pedal mounting. Thus application of the brakes of the vehicle by forwardly pivoting the pedal will be followed by a return of the pedal to normal position through the return force of the brake actuator, i.e., the brakes do not remain applied except insofar as they are held in such position by the foot of the operator.

As noted above the present invention is adapted for utilization as original equipment upon vehicles or alternatively may be applied as a modification to existing vehicles. In the latter instance it is preferable that the invention be capable of ready and simple installation requiring no major modification of the vehicle components. Reference in this respect is made to FIG. 4 of the drawings generally indicating one possible configuration of an adaptor kit for a conventional gasoline powered vehicle or the like to embody the present invention therein. Upon a floor board 51 there is normally provided a bracket 52 upon which the heel of an accelerator pedal is pivotally mounted. As shown in this Figure, the conventional accelerator pedal is removed and a mounting plate 53 is attached to the bracket as for example by a pin 54 preferably locked thereto as by a cotter pin or the like. The mounting plate 53 includes a pair of upright lugs 55 that together with the plate then comprise a mounting bracket of the present invention. A dual purpose foot pedal 56 having depending lugs 57 thereon is mounted upon the bracket, as for example in the manner illustrated in FIG. 3. At the rear or heel end of the foot pedal 56 provision is made for engagement of the pedal with brake actuating means 61 as, for example, by means of a bar 62 secured to the depending arm of the brake actuator 61 and engaging the underside of the toe portion of the foot pedal 56 by means of a small retained ball or the like 63. A pin 64 with an enlarged lower end may depend from the pedal in extension through an opening in the bar 62 as a lost motion connection to the brake pedal 61. This ensures return pivoting of the pedal if the brake alone is depressed.

It is to be understood that the physical location and configuration of accelerator and brake control or operating means of motor vehicles varies between different makes and models thereof. In order to provide a relatively universal combination of elements or application to a wide variety of different vehicles to carry out the present invention, the manner of engagement with the brake actuator may be subject to substantial variation. Thus, for example, the bar 62 may be provided for bolting to the lower end of a depending brake actuator arm 61 in place of the pedal normally bolted thereto and extending laterally across the floor board beneath the foot pedal 56 of the present invention. Under those circumstances wherein the brake actuator is mounted in such a manner that moves substantially forward and backward along the floor board it may be advantageous to provide bearing means such as the captive ball 63 on the bar, however, further applications wherein the pivotal motion of the pedal 56 closely follows or is substantially the same as the pivotal motion of the brake actuator arm 61 no such provision need be made.

It is furthermore noted that the mounting plate 53 illustrated in FIG. 4 is appropriately apertured for passage of the accelerator bar or propulsion control means in those circumstances wherein such means extend through the floor board in the manner illustrated. For other applications it is realized that the throttle control or acceleration control means 58 may be mounted to depend from beneath the dashboard of the vehicle and in this case it is possible for the connection between the heel portion of the foot pedal and the throttle control means to extend entirely above the floor board within the operating cab of the vehicle. In this embodiment of the present invention there may also be provided a lost motion device incorporated in the accelerator control connection as, for example, in the manner similar to or the same as that illustrated in FIG. 1 and described above.

The present invention may be provided for sale to the general public in the form of a modification or adaptor kit incorporating, for example, a mounting place, pivot axles and springs, a foot pedal, accelerator control connection and possibly means for engaging the pedal with a brake actuator. The single pedal pivot mounting may either be tensioned for particular models of vehicles or alternatively may be adapted to be adjusted by the installer to establish bias at this pivot connection as required by the foregoing criteria.

There has been described above an improvement in single pedal control means for self powered vehicles wherein both braking action and propulstion controls incorporated in a single pedal are particularly arranged so that normal reactions of an operator result in the application of braking rather than acceleration. Of particular advantage is the provision in the present invention for what may be termed cruise control wherein acceleration or throttle settings accomplished by the single pedal mechanism hereof are maintained without the necessity of continuously applying pressure or force to the foot pedal. This provides a major advance in the art wherein the motorist or vehicle operator is not then required to continuously apply pressure in order to maintain the velocity of a vehicle traveling along a highway or the like. Conventional accelerator systems for vehicles require the operator to maintain one leg in a tensed condition in order to continuously maintain a desired pressure on the accelerator pedal while on the other hand the present invention entirely obviates the necessity of applying such pressure and consequently provides the advantage that the operator can entirely relax his foot and leg during normal steady speed travel. This cruise control is herein accomplished in a simple and inexpensive manner and it is to be appreciated that various modifications in the actual structure of mechanism therefor is possible within the scope of the invention.

What is claimed is:

1. Control mechanism in combination with a the brake actuator and with a throttle actuator of a self powered vehicle in which both throttle and brake actuators are biased to return to unactuated positions, said control mechanism comprising a single foot pedal disposed to engage a brake actuator at the front of the pedal and a throttle actuator at the rear of the pedal, means pivotally mounting said pedal adjacent the middle thereof for pivoting by foot pressure forwardly to engage the brake actuator and rearwardly to engage said throttle actuator, and spring biasing means on said pivotal mounting means for resisting return motion of said pedal from pivoted position, said spring biasing means having sufficient force and engaging said pivotal mounting means with sufficient frictional resistance to overcome return biasing of said throttle actuator and thus maintain said pedal in any preset throttle position during cruising of said vehicle without continuously maintaining foot pressure to the foot pedal, but said frictional resistance of said spring biasing means being insufficient to overcome the return biasing of said brake actuator.

2. The combination of claim 1 further defined by said pedal having a lateral extension at one end thereof and said mounting means mounting said pedal to align same with said throttle actuator and the pedal extension with the brake actuator.

3. The combination of claim 1 further defined by said means pivotally mounting said pedal including a bracket having at least one upstanding apertured wall portion and adapted to be secured to the floorboard of a vehicle, said pedal having at least one apertured lug depending from substantially the center of said pedal and adapted to contact said bracket wall with apertures thereof aligned, an axle having enlarged ends extending through the apertures of said bracket wall and pedal lug, and a compression spring between the axle end and the combination of wall and lug to resist pivotal movement of the pedal with respect to the mounting bracket.

4. An adapter kit for self powered vehicles in combination with the throttle and the brake pedal which are biased to return to unactuated positions, comprising a rigid bracket connected to the accelerator pedal mounting pieces and including a pair of upstanding apertured walls spaced apart laterally of the bracket, a foot pedal having a pair of laterally spaced depending apertured lugs contacting said bracket walls alongside same with the apertures in walls and lugs aligned, pivotal mounting means for said foot pedal comprising a pair of bolts extending one through the aperture of each pair of contacting lugs and walls as pivot axles, nuts threaded upon said bolts, and a compression spring about each bolt and compressed against the wall or lug through which the bolt extends, means at the heel portion of said pedal for engaging accelerator actuator connections, and means at the toe portion of said pedal engaging said brake pedal, said compression springs having sufficient force and engaging said pivotal mounting means with sufficient frictional resistance to overcome return biasing of such accelerator actuator and thus maintain said foot pedal in any preset accelerator actuator position during cruising of said vehicle without continuously maintaining foot pressure to the foot pedal, but said frictional resistance of said compression springs being insufficient to overcome return biasing of said brake pedal.

* * * * *